United States Patent
Komzisk (10) Patent No.: US 10,409,933 B2
(45) Date of Patent: *Sep. 10, 2019

(54) COMPUTER-AIDED SIMULATION OF ADDITIVE MANUFACTURING PROCESSES

(71) Applicant: Siemens Product Lifecycle Management Software Inc., Plano, TX (US)

(72) Inventor: Louis Komzisk, Huntington Beach, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 637 days.

This patent is subject to a terminal disclaimer.

(21) Appl. No.: 14/627,518

(22) Filed: Feb. 20, 2015

(65) Prior Publication Data

US 2016/0246908 A1 Aug. 25, 2016

(51) Int. Cl.
| | |
|---|---|
| *G06F 17/50* | (2006.01) |
| *B29C 64/386* | (2017.01) |
| *B33Y 50/00* | (2015.01) |
| *G06T 19/00* | (2011.01) |
| *B29C 67/00* | (2017.01) |

(Continued)

(52) U.S. Cl.
CPC ........ *G06F 17/5018* (2013.01); *B29C 64/386* (2017.08); *B29C 67/00* (2013.01); *B33Y 50/00* (2014.12); *G06F 17/50* (2013.01); *G06T 17/10* (2013.01); *G06T 17/20* (2013.01); *G06T 19/00* (2013.01); *G06T 2219/008* (2013.01)

(58) Field of Classification Search
CPC ..... G06F 17/5018; G06F 17/50; B33Y 50/00; B29C 64/386; B29C 67/00; G06T 17/10; G06T 17/20; G06T 19/00; G06T 2219/008

USPC .......................................................... 703/2
See application file for complete search history.

(56) References Cited

U.S. PATENT DOCUMENTS

| | | | | |
|---|---|---|---|---|
| 5,754,738 | A | * | 5/1998 | Saucedo ................. G06F 17/50 706/11 |
| 5,781,446 | A | * | 7/1998 | Wu ...................... G06F 17/5072 716/122 |

(Continued)

FOREIGN PATENT DOCUMENTS

| | | |
|---|---|---|
| CN | 101383053 A | 3/2009 |
| JP | 2005259043 A | 9/2005 |
| WO | 2014028879 A1 | 2/2014 |

OTHER PUBLICATIONS (H.J. Jee et al., A visual simulation technique for 3D printing, 2000, Elsevier Ltd., Advances in Engineering Software 31 (2000) 97-106).*

(Continued)

*Primary Examiner* — Rehana Perveen
*Assistant Examiner* — Justin C Mikowski (57) ABSTRACT

Methods for computer-aided simulation of additive manufacturing processes and corresponding systems and computer-readable mediums. A method includes receiving a finite element (FE) model of a part to be manufactured. The method includes intersecting a depositing layer line with the FE model to define an FE layer mesh that represents a manufacturing layer. The method includes simulating manufacture of the FE layer mesh and correspondingly modifying the FE model. The method includes displaying the modified FE model.

17 Claims, 4 Drawing Sheets

(51) Int. Cl.
G06T 17/10 (2006.01)
G06T 17/20 (2006.01)

(56) References Cited

U.S. PATENT DOCUMENTS

| | | | | |
|---|---|---|---|---|
| 5,849,238 | A * | 12/1998 | Schmidt | B29C 33/04 264/113 |
| 7,023,441 | B2 * | 4/2006 | Choi | G06F 17/30259 345/441 |
| 2002/0103555 | A1 * | 8/2002 | Wallace, Jr. | G06F 17/5036 700/95 |
| 2003/0120472 | A1 * | 6/2003 | Lind | G06F 17/5009 703/13 |
| 2007/0273896 | A1 * | 11/2007 | Yamamura | H04N 1/00832 358/1.1 |
| 2008/0099569 | A1 | 5/2008 | Plumpton et al. | |
| 2012/0016639 | A1 | 1/2012 | Duan et al. | |
| 2012/0105903 | A1 * | 5/2012 | Pettis | G06F 3/12 358/1.14 |
| 2014/0039659 | A1 * | 2/2014 | Boyer | B29C 67/0051 700/98 |
| 2014/0086780 | A1 * | 3/2014 | Miller | A61F 5/01 419/1 |
| 2014/0117585 | A1 * | 5/2014 | Douglas | B29C 67/0055 264/401 |
| 2015/0066178 | A1 * | 3/2015 | Stava | B29C 67/0088 700/98 |
| 2015/0079327 | A1 * | 3/2015 | Kautz | B29C 67/0088 428/64.1 |
| 2015/0269289 | A1 * | 9/2015 | Kim | G06F 17/5009 703/6 |
| 2016/0086376 | A1 * | 3/2016 | Tang | G06T 17/20 345/420 |

OTHER PUBLICATIONS (Paul Calvert, Inkjet Printing for Materials and Devices, 2001, American Chemical Society, Chem. Mater. 2001, 13, 3299-3305).*
(Aleksey Golovinskiy et al., A Statistical Model for Synthesis of Detailed Facial Geometry, 2006, Association for Computing Machinery, Inc., 2006, 1025-1034).*
Ibiye Aseibichin Roberts, "Investigation of Residual Stresses in the Laser Melting of Metal Powders in Additive Layer Manufacturing", University of Wolverhampton, Sep. 2012, 1-246. (Year: 2012).*
Hussein et al., "Finite Element Simulation of the Temperature and Stress Fields in Single Layers Built Without Support in Selective Laser Melting," Materials and Design, vol. 52, 2013, 10 pages.
PCT Search Report dated May 24, 2016, for Application No. PCT/US2016/015920, 11 pages.
Pohl, H., et al. "Thermal Stresses in Direct Metal Laser Sintering." Proceedings of Solid Freeform Symposium, 2001, pp. 366-372.
Aggarangsi, P. and Beuth, J.L. "Localized Preheating Approaches for Reducing Residual Stress in Additive Manufacturing." Proceedings of 17th, Solid Freeform Fabrication Symposium, 2006, pp. 709-720.
Kempen, K., et al. "Lowering Thermal Gradients in Selective Laser Melting by Pre-Heating the Baseplate." Proceedings of Solid Freeform Fabrication Symposium Proceedings, 2013, 9 pages.
Ong, R. and Beuth, J. "Residual Stress Control Issues for Thermal Deposition of Polymers in SFF Processes." Proceedings of Solid Freeform Symposium, 2000, pp. 209-218.

Wang, D., et al. "Research on the fabricating quality optimization of the overhanging surface in SLM process." The International Journal of Advanced Manufacturing Technology, 2013, vol. 65, pp. 1471-1484.
Klingbeil, N.W., et al. "Residual stress-induced warping in direct metal solid freeform fabrication." International Journal of Mechanical Sciences, 2002, vol. 44, pp. 57-77.
Matsumoto, M., et al. "Finite element analysis of single layer forming on metallic powder bed in rapid prototyping by selective laser processing." International Journal of Machine Tools & Manufacture, 2002, vol. 42, pp. 61-67.
Alimardani, M., et al. "A 3D dynamic numerical approach for temperature and thermal stress distributions in multilayer laser solid freeform fabrication process." Optics and Lasers in Engineering, 2007, vol. 45, pp. 1115-1130.
Krol, T.A., et al. "Optimization of Supports in Metal-Based Additive Manufacturing by Means of Finite Element Models." Proceedings of 23rd Solid Freeform Fabrication Symposium, 2012, pp. 707-718.
Krol, T.A., et al. "Verification of structural simulation results of metal-based additive manufacturing by means of neutron diffraction." Physics Procedia, 2013, vol. 41, pp. 894-857.
Krol, T.A., et al. "Prioritization of process parameters for an efficient optimisation of additive manufacturing by means of a finite element method." Procedia CIRP, 2013, vol. 12, pp. 169-174.
"Thermo-mechanical modeling of Additive Manufacturing." www.pancomputing.com, retrieved Jan. 29, 2015, 23 pages.
3DSIM. www.3dsim.com, published May 16, 2014, retrieved Feb. 6, 2015, 14 pages.
EP Search Report dated Feb. 22, 2018, for EP Application No. 16752785.2, 15 pages.
Michael F. Zaeh et al: "Investigations on Residual Stresses and Deformations in Selective Laser Melting", Production Engineering, vol. 4, No. I, Feb. 1, 2010 (Feb. 1, 2010), 12 pages.
KW Dalgarno et al: "Finite Element Analysis of Curl Development in the Selective Laser Sintering Process", 7th Solid Freeform Fabrication (SFF) Symposium, Aug. 14, 1996.
Ratnadeep Paul et al: "Effect of Thermal Deformation on Part Errors in Metal Powder Based Additive Manufacturing Processes"; Journal of Manufacturing Science and Engineering, vol. 136, No. 3, Jun. 2014, 12 pages.
Alimardani et al: "A 3D Dynamic Numerical Approach for Temperature and Thermal Stress Distributions in Multilayer Laser Solid Freeform Fabrication Process"; Optics and Lasers in Engineering, Elsevier, Amsterdam, NL, vol. 45. No. 12, Sep. 15, 2007, 16 pages.
Heigel J.C. et al: "Thermo-mechanical model development and validation of directed energy deposition additive manufacturing of Ti—6Al—4V"; Additive Manufacturing, vol. 5, Oct. 2014, 11 pages.
Chinese office action dated Sep. 11, 2018, for CN Application No. 201580050314.5, 10 pages.
Masoud Alimardani et. al., "A 3D Dynamic Numerical Approach for Temperature and Thermal Stress Distributions in Multilayer Laser Solid Freeform Fabrication Process", Optics and Lasers in Engineering 45 (2007) 1115-1130. (Year: 2007), 16 pages.
J.C. Heigel, et. al., "Thermo-mechanical Model Development and Validation of Directed Energy Deposition Additive Manufacturing of Ti—6Al—4 V", Additive Manufacturing 5 (2015) 9-19. Online Oct. 22, 2014. (Year: 2014), 11 pages.

* cited by examiner

COMPUTER-AIDED SIMULATION OF ADDITIVE MANUFACTURING PROCESSES

CROSS-REFERENCE TO RELATED APPLICATION

This application has subject matter in common with commonly-assigned U.S. Provisional Patent Application 62/052,786, filed Sep. 19, 2014, and U.S. patent application Ser. No. 14/610,709, filed Jan. 30, 2015, which are hereby incorporated by reference.

TECHNICAL FIELD

The present disclosure is directed, in general, to computer-aided design ("CAD"), visualization, engineering ("CAE") and manufacturing ("CAM") systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for computer-aided simulation of additive manufacturing processes and corresponding systems and computer-readable mediums. A method includes receiving a finite element (FE) model of a part to be manufactured. The method includes intersecting a depositing layer line with the FE model to define an FE layer mesh that represents a manufacturing layer. The method includes simulating manufacture of the FE layer mesh and correspondingly modifying the FE model, which can include corresponding modifications to other FE layer meshes of the FE model. The method includes displaying the modified FE model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Selective laser sintering (SLS) and selective laser melting (SLM) are additive manufacturing technologies that build three dimensional parts by using a high power laser to selectively sinter or melt a powdered material layer by layer. They offer great advantages compared to traditional solid fabrication methods and are two of the common choices of solid freeform fabrication methods. Due to the presence of thermal gradient during heating and cooling, laser sintering or laser melting is known to introduce residual stress, which can cause deformations (warping) and/or cracks on the part. The presence of these defects can hinder tolerance and affect mechanical strength. However, the location and magnitude of such deformations are not always easily predictable, especially for complex geometries.

Disclosed embodiments include a computer-aided simulation tool that can help evaluate the locations and amounts of warping for any arbitrary geometry. Based on the results of the simulation, strategies to reduce warping can be derived and tested before manufacturing the part. Disclosed embodiments convert a geometric model of a part to be manufactured to a finite element analysis (FEA) model as a whole, and use the FEA model for simulation. Disclosed embodiments can therefore avoid inefficiencies of repeated generation of whole or partial FEA models.

Some computer-aided engineering analysis software systems lack the functionalities to evaluate the warping defects. Warping of parts produced by SLS and SLM has been observed and investigated in the past, but to date, detailed studies have been limited to simplified geometries, for instance a single rectangular shaped layer. Overhang structures are known to be more prone to warping. But warping of more complex geometry has not yet been investigated, nor how can it be minimized. Earlier studies showed that pre-heating of the base plate can reduce the thermal gradient in SLS. But this does not offer localized thermal gradient reduction for complex shapes. More recently, support structures, which are printed in attachment with the part, are designed to act as heat sinks to reduce thermal gradient and mechanical support overhang structures during the SLS and SLM processes, but guidelines on the placement and design of heat sinks relative to a part of arbitrary shape are still being developed.

Disclosed embodiments include systems and methods that can numerically predict the mechanical deformation of a part during SLS or SLM by applying layer, load, and thermal response data to an FEA model. Disclosed techniques allow the user to understand what locations of a part are more prone to warping, and also functions as a test bed to find the optimal support structure design to reduce warping for any arbitrarily shaped part.

Figure 1:
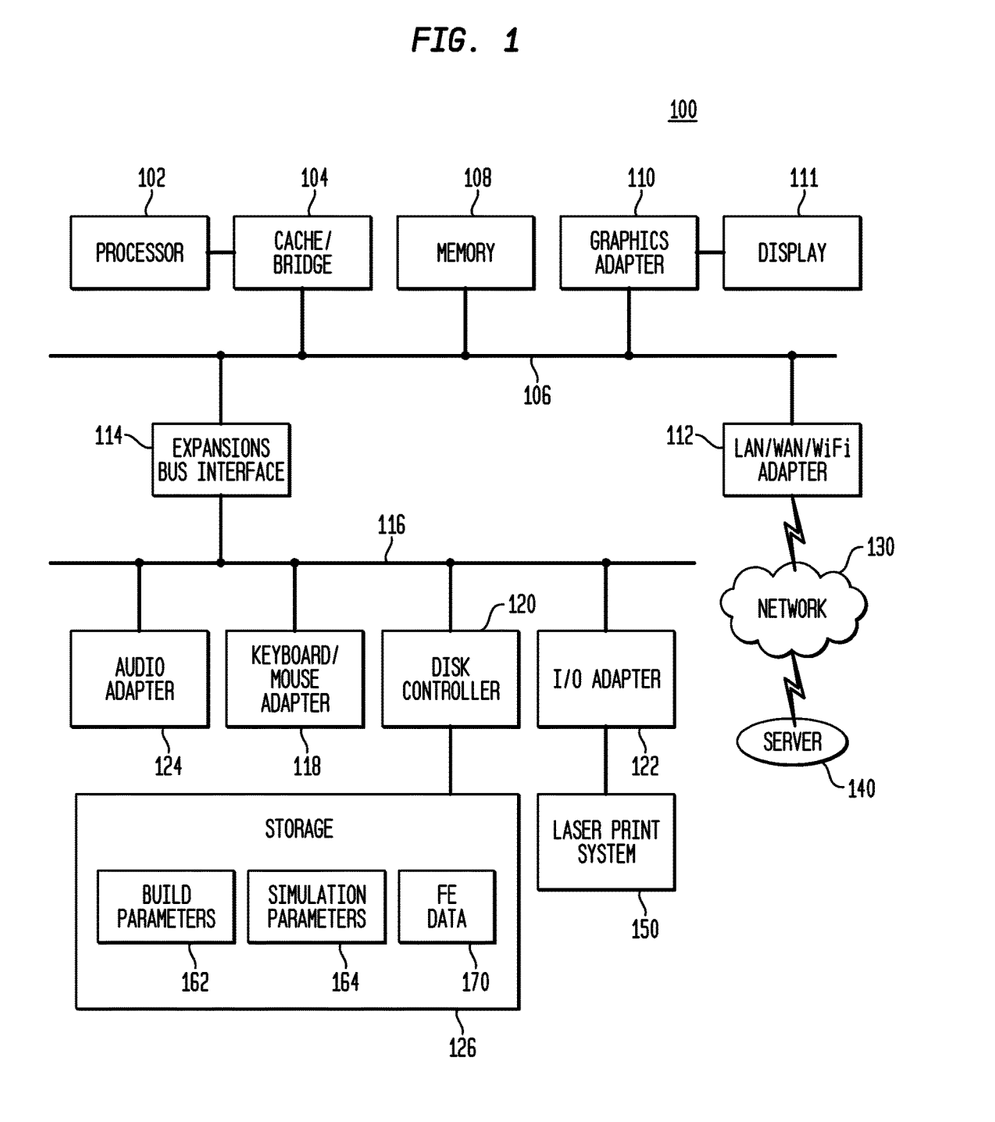
FIG. 1 illustrates a block diagram of a data processing system in which an embodiment can be implemented.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. I/O adapter 122 can be connected to a laser print system 150, such as an SLS or SLM system, that is capable of performing laser-based additive manufacturing tasks as described herein to produce a physical part. Storage 126 can store any data described herein, including build parameters 162, simulation parameters 164, FE data 170, model loads, model constraints, and other data.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments include systems and methods that can numerically predict the mechanical deformation of a part caused by the repeated heating and cooling during selective laser sintering. The heating and cooling, as well as deposition of layers can be simulated. In an SLS or SLM system, when a part is being manufactured, successive layers of powder are added to a powder bed. Each layer of powder is laser-heated at specific points to solidify the powder at that point and fuse it to any solid portion in the previous powder layer. Because each layer is manufactured successively, any deformation in a lower layer affects the overlying layer(s). Disclosed embodiments can simulate and predict the deformation of a given layer and the cumulative deformation of many or all layers of the part.

For a given arbitrary shape, disclosed embodiments can split the shape into multiple slices based on the layer thickness. The "layer thickness" refers to the thickness of each powder layer that is to be used in the manufacturing process. After each finite element layer mesh is added to the domain, a coupled thermo-structural analysis can be performed to calculate the temperature and mechanical deformation for the heating and cooling during SLS or SLM. The displacements are applied to the finite element mesh and this process is repeated until all the layers are added and fused together. The final geometry can then be compared against originally planned 3D CAD model to identify locations that are deformed. In this embodiment, the simulation is performed by a CAE system in the same software environment of the CAD system. Also, temperature and mechanical stress maps during the heating and cooling phases can be analyzed to further understand why a certain region warps.

Other additive manufacturing solutions are based on a geometric model of the part being manufactured, and the structural integrity of a 3D printed object is either not evaluated or assessed by only analyzing the designed object. This is inadequate as the printing process produces deformations that result in a final object not necessarily conformal to the original design.

Disclosed embodiments enable the *a priori* simulation of the printing process, layer by layer, based on the FEA model (mesh) of the complete geometry.

According to one disclosed embodiment, and as described in more detail below, the system can simulate the printing process by intersecting a depositing layer line with the finite element model creating a finite element mesh, applying the heat load simulating the depositing process on the current top layer of the mesh, executing a nonlinear transient heat transfer analysis of the partial structure including gravity loads, deforming the finite element node point locations to adhere the results of the analysis, and repeating this process until the complete structure is analyzed. In this embodiment, the final stage analyzes the simulated printed object as opposed to the design object.

Disclosed embodiments can exploit the capabilities of the structural and thermal solvers in, for example, the NX software product of Siemens Product Lifecycle Management Software Inc. (Plano, Tex.) to perform a coupled thermo-structural analysis to predict warping.

Thermal analysis: Using thermal simulation, the temperature gradient caused by heating or cooling of the laser beam can be simulated. Users can specify the laser power, time duration used to heat the layers, as well as time for cooling and boundary conditions of the heat transfer happening during heating and cooling.

Structural analysis: Disclosed embodiments, using structural simulation tools such as the NX Nastran software product of Siemens Product Lifecycle Management Software Inc. (Plano, Tex.), can calculate the mechanical stress associated with this temperature change. Structural constraints can be specified to indicate whether the part is constrained at any time. Structural loads, such as gravity, can also be specified if necessary. From the structural simulation, deformation of the part is calculated. Also, mechanical stress within a part due to the thermal strain can also be evaluated. This tool also has the capability to evaluate inelastic strain when the appropriate material properties are properly defined.

Coupled thermo-structural analysis: the thermal and structural analysis processes can be performed simultaneously, disclosed embodiments can couple the two simulations and automate this coupled thermo-structural analysis. Spatially and temporally varying temperature will affect the deformation, and at the same time, the deformation (hence change in geometry of domain for thermal simulation) also affects the prediction of temperature gradient in thermal analysis.

Figure 2:
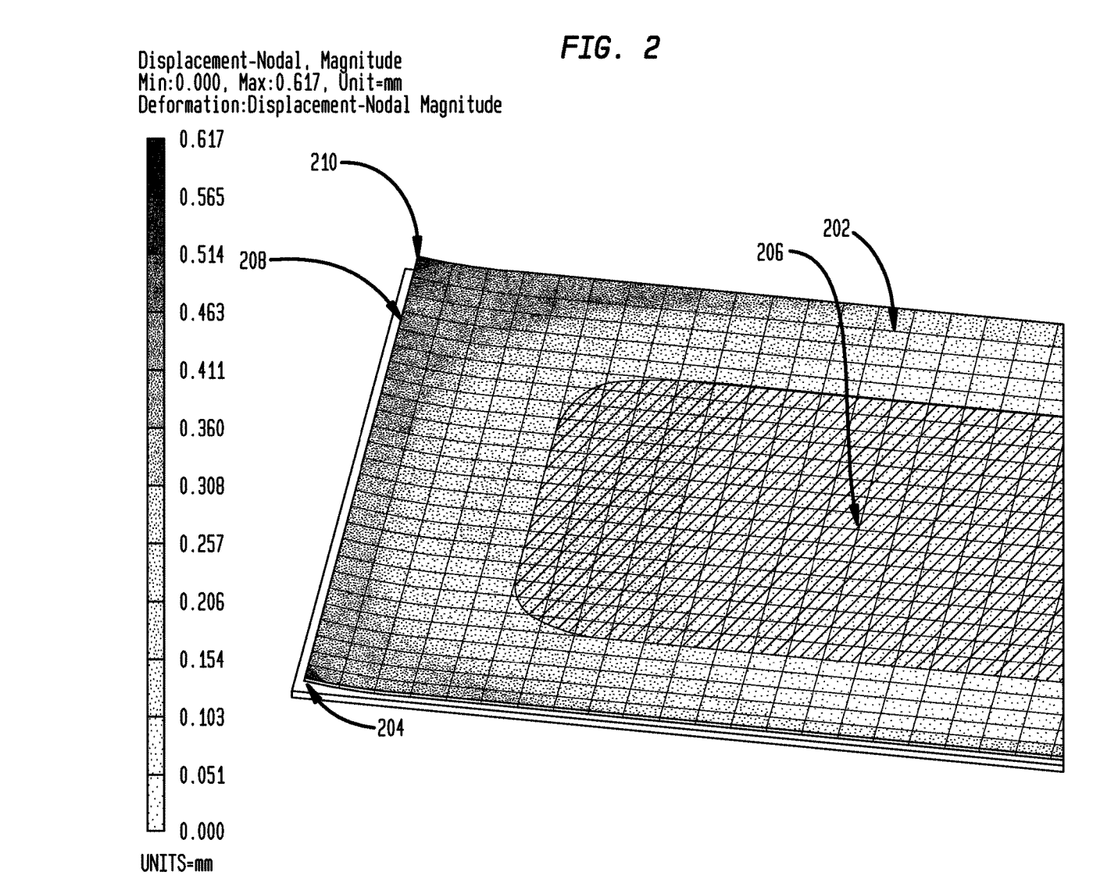
FIG. 2 illustrates numerically predicted deformation of a layer as compared to the original planned geometry, in accordance with disclosed embodiments.

FIG. 2 illustrates numerically predicted deformation of a layer (which can be color-coded by displacement) as compared to the original planned geometry (which can be differently colored). This figure shows an example of a simulated layer 202 as a thin three-dimensional (3D) mesh with deformation as compared to an undeformed layer 204. In this example, there is relatively little deformation in the center area 206, but a greater amount of deformation at edge areas such as at edge 208, and a significant deformation at corner 210.

Disclosed embodiments provide several technical advantages. Disclosed embodiments can handle any arbitrary geometry, as SLS and SLM parts can come in very complex forms. Heat sink designs can be incorporated and tested.

Disclosed embodiments can be applied for SLS or SLM of any material, as long as the material properties are supplied.

Disclosed embodiments allow the operating condition to be adjusted (e.g. laser power, powder bed temperature, duration of heating/cooling, layer thickness, cooling temperature, substrate base plate temperature, mechanical constraints etc.)

Systems and methods as described herein can help improve the quality of parts fabricated by SLS and SLM. Using this tool, location of warping can be identified numerically before the part is being printed. Design of various support structures can be tested without physically printing all the different configurations. This saves material cost. This tool can take in any arbitrary shape, as well as heat sink design. The effect of adding heat sinks can also be evaluated, so that warping can be minimized. With this tool, users can add heat sinks of different configurations and find the design that minimizes warping for a given part.

Figure 3:
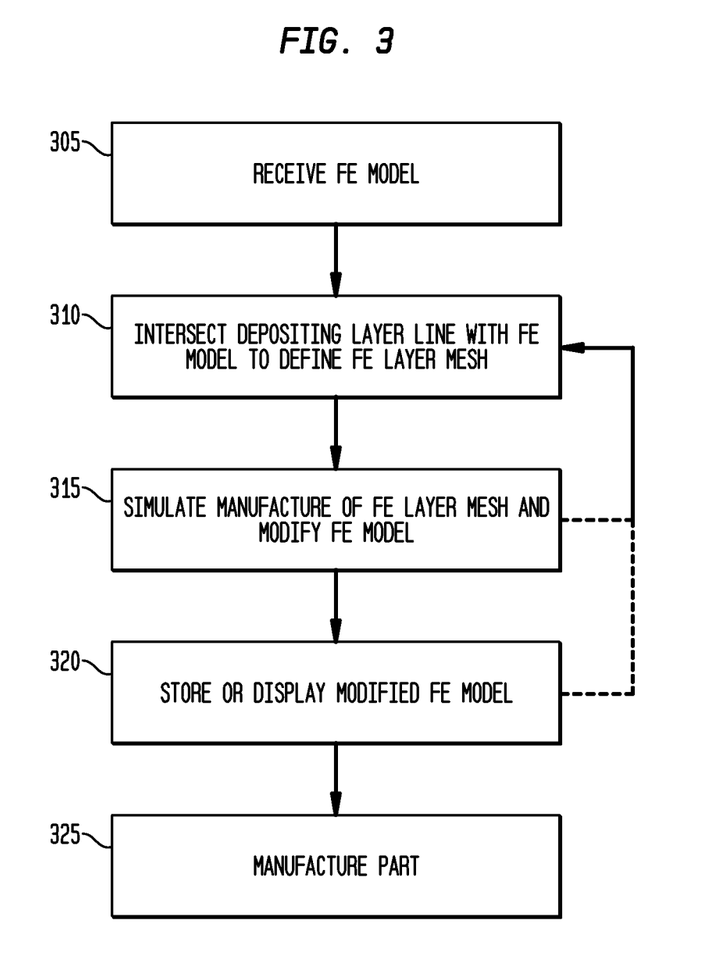
FIG. 3 illustrates a flowchart of a process in accordance with disclosed embodiments.
Figure 4:
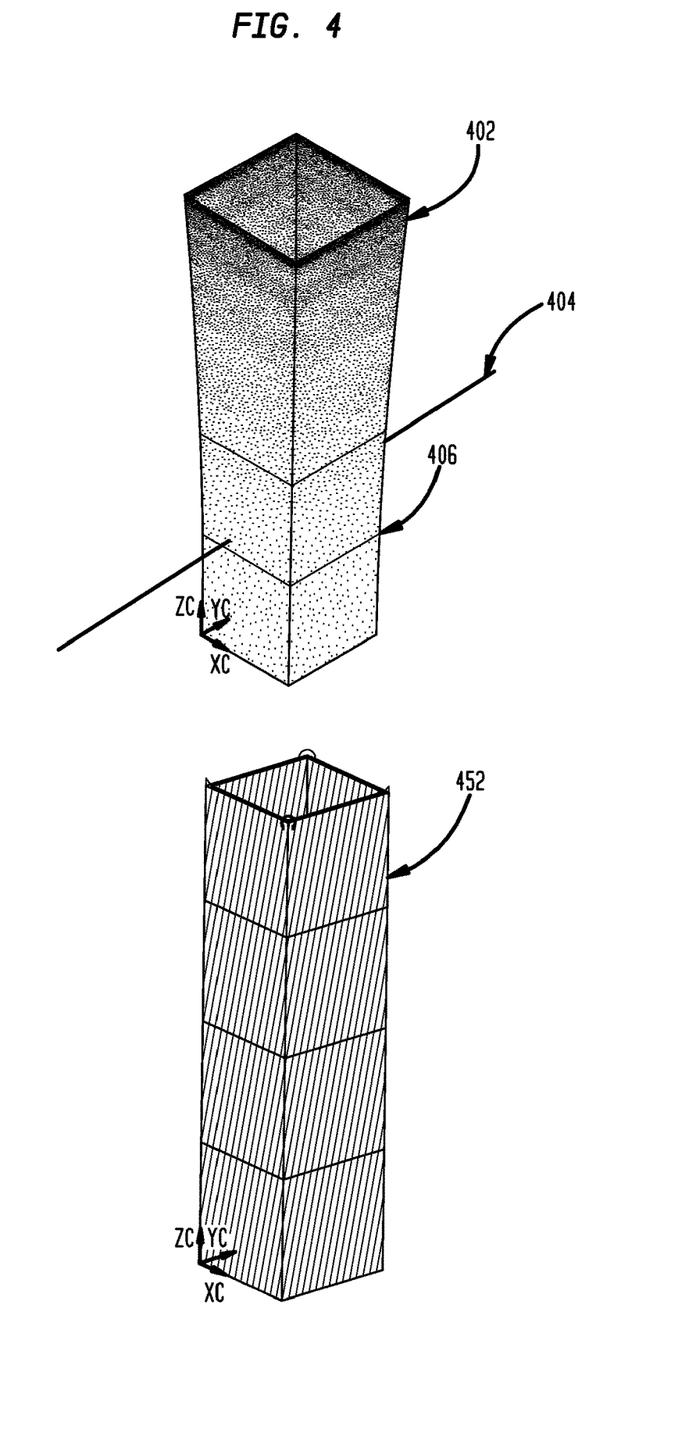
FIG. 4 illustrates various elements of a process as described herein, and is used to illustrate the process of FIG. 3.

FIG. 3 illustrates a flowchart of a process in accordance with disclosed embodiments that may be performed, for example, by a PLM or PDM system, whether implemented as a data processing system 100 as described above, as a "cloud-based" data processing system, or otherwise. FIG. 4 illustrates various elements of a process as described herein, and is used to illustrate the process of FIG. 3.

The system receives a finite element (FE) model of a part to be manufactured (305), such as FE model 402 illustrated in FIG. 4. Receiving, as used herein, can include loading from storage, receiving from another device or process, receiving via an interaction with a user, or otherwise. In particular, this step can include creating the FE model from a solid model, such as solid model 452. The FE model can include FE data 170 that can include, for example, the solid walls of the part to be manufactured, the internal lattices of the part to be manufactured, void areas, support structures required to correctly manufacture the part, and other data. The FE model can represent the entire part to be manufactured.

This receiving process can include specifying or receiving build parameters 162, that specify how the part represented by the FE model 402 will be manufactured, and specifying or receiving simulations parameters 164, that specify how the solid model 402 simulates the part or its manufacture. The simulations parameters can specifically include thermal response data that defines how the additive manufacturing material retains heat, reacts at different temperatures, cools as a function of other heated or cooled layers, or otherwise. The simulation parameters can also include structural load information for the part, such as weight, mass, density, or other parameters for specific points of the part, the material to be used to manufacture the part, and others.

The system intersects a depositing layer line with the FE model to define an FE layer mesh (310). The intersection of the depositing layer line with the FE model is used to simulate the printing process for the layer defined by the depositing layer line, and represents a manufacturing layer. The system can perform this intersection multiple times to define how the part is to be manufactured in layers, from bottom to top, using SLS or SLM techniques. In FIG. 4, depositing layer line 404 defines the FE layer mesh 406 at that line. The depositing layer line can also be a plane, and such a plane is intended to be included in the "depositing layer line." Note that, as the process iterates over multiple layers, the depositing layer lines are not required to be equidistant from each other, so that the system can accommodate thicker and thinner layers as the design or hardware may require.

The system simulates manufacture of each FE layer mesh, representing a manufacturing layer, and correspondingly modifies the FE model (315). As part of the simulation, the system applies the simulation parameters to the FE layer mesh, which can include applying a heat load to the FE layer mesh according to the thermal response data. Applying the simulation parameters to the FE layer mesh can include performing a nonlinear transient heat transfer analysis of the FE layer mesh, and of the entire FE model, including in particular any of the FE model structure below the current FE layer mesh. The nonlinear transient heat transfer analysis can include applying structural load information for that FE layer mesh in conjunction with the heat transfer analysis so that deformations caused by both heat and structural loads are considered. Simulating manufacture of each FE layer mesh can include applying the structural load information to the FE layer mesh and to the entire FE model. Simulating manufacture of each FE layer mesh can include deforming the FE node point locations of the FE layer mesh according to the applied simulation parameters. As part of this simulation, the system can store the simulation data for each FE layer mesh, including the deformation and temperature data for each FE layer mesh. In various embodiments, neither the FW layer mesh nor the FE model is regenerated from a solid model or geometric model as part of this process.

In specific cases, applying the simulation parameters to the FE layer mesh can include evaluating distortions according to the thermal response data caused by the simulated temperature of the current FE layer mesh and the relative temperatures of other FE layer meshes in the FE model, in particular the meshes directly above and below the current FE layer mesh. For example, in the simulation, the thermal response of the current layer can take into account the temperature of the just-manufactured layer immediately below, and the about-to-be manufactured layer directly above.

In this way, the modifications to the FE layer mesh can be made specifically according to thermal-structural coupled manufacturing simulations; that is, while simulating manufacture of a given FE layer mesh, the system simulates the thermal or structural distortions caused by the manufacturing process itself (as illustrated in FIG. 2), and applies these distortions as modifications to the FE model at that FE layer mesh. For each FE layer mesh, as it is simulated, the system can apply thermal and structural loads to accurately simulate the distortions caused. Because the entire FE model is already present, the structural loads such as gravity can be applied throughout the entire FE model to ensure that the specific FE layer mesh is properly simulated.

The system stores or displays the modified FE model (320). The modified FE model is a model of the part to be manufactured, and represents the part including deformations produced by the simulated manufacture process, since the FE model is modified according to each of the FE layer meshes. This step can include comparing the modified FE model 402 with the solid model 452 to illustrate the deformations anticipated to be caused by the actual manufacture process. Note, in FIG. 4, that FE model 402 is wider at the top than in solid model 452, as the modified FE model 402 reflects the widening distortion caused by heat and structural load effects.

Steps 310 and 315 (and optionally 320) can be performed as a repeating iterative process, so that successive FE layer meshes are defined and simulated to modify the FE model.

In such a way, the modified FE model represents cumulative effect of the distortions. In particular, these steps can be performed repeatedly for multiple FE layer meshes from the "bottom" (first-manufactured end of the part) to the "top" (last-manufactured end of the part) so that the simulated manufacture of each FE layer mesh accounts for the modifications caused by the FE layer meshes that will be previously manufactured. By using the full FE model and modifying according to the simulations, the process can be performed much more efficiently than re-creating an FE model from a geometric model in each iteration.

The system can manufacture the 3D mesh model or the solid model (325). Of course, when the simulations are correct, printing the solid model using SLS or SLM techniques as described herein will produce a physical part that more closely resembles the 3D mesh model, since the 3D mesh model reflects the deformations detected from the simulations of producing each of the layers.

The following patent publications and papers are incorporated by reference: WO2014/028879 A1, Feb. 20, 2014; PCT/US2013/055422, Aug. 16, 2013, *Proceedings of Solid Freeform Symposium,* 2000/P. 366-372; *Proceedings of 17th, Solid Freeform Fabrication Symposium,* 2006/P. 709-720; *Proceedings of Solid Freeform Fabrication Symposium Proceedings,* 2013; *Proceedings of Solid Freeform Symposium,* 2000/P. 209-218; *The International Journal of Advanced Manufacturing Technology* 2013/Vol. 65/P. 1471-1484; *International Journal of Mechanical Sciences,* 2002/Vol. 44/P. 57-77; *International Journal of Machine Tools & Manufacture,* 2002/Vol. 42/P. 61-67; *Optics and Lasers in Engineering,* 2007/Vol. 45/P. 1115-1130; *Proceedings of 23rd Solid Freeform Fabrication Symposium,* 2012/P. 707-718; *Physics Procedia,* 2013/Vol. 41/P. 894-857; and *Procedia CIRP,* 2013/Vol. 12/P. 169-174.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method performed by a data processing system to design and manufacture a part while accounting for deformities caused by heat and structural load effects, comprising:
  receiving a finite element (FE) model of a part to be manufactured;
  for each of a plurality of layers:
    intersecting a depositing layer line with the FE model to define an FE layer mesh that represents a manufacturing layer for the corresponding layer;
    simulating manufacture of the FE layer mesh for the corresponding layer;
    during the simulated manufacture, evaluating distortions to each FE layer mesh caused by heat and structural load effects, and evaluating effects of adding different heat sink configurations to identify a design that minimizes warping of the part; and
    modifying the FE model according to the distortions caused by heat and structural load effects during the simulated manufacture and according to the identified design that minimizes warping of the part; and
  manufacturing the part according to the modified FE model, including the distortions caused by heat and structural load effects.

2. The method of claim 1, wherein simulating manufacture of each FE layer mesh includes applying simulation parameters to the FE layer mesh, including applying a heat load to the FE layer mesh according to thermal response data.

3. The method of claim 1, wherein simulating manufacture of each FE layer mesh includes applying simulation parameters to the FE layer mesh, including performing a nonlinear transient heat transfer analysis of the FE model including structural load information.

4. The method of claim 1, wherein simulating manufacture of each FE layer mesh includes deforming FE node point locations of the FE layer mesh according to applied simulation parameters.

5. The method of claim 1, wherein receiving the FE model includes creating the FE model from a solid model.

6. The method of claim 1, wherein simulating manufacture of each FE layer mesh includes applying structural loads to the entire FE model.

7. A data processing system configured to design and manufacture a part while accounting for deformities caused by heat and structural load effects, comprising:
  a processor; and
  an accessible memory, the data processing system particularly configured to receive a finite element (FE) model of a part to be manufactured;
  for each of a plurality of layers:
    intersect a depositing layer line with the FE model to define an FE layer mesh that represents a manufacturing layer for the corresponding layer;
    simulate manufacture of the FE layer mesh for the corresponding layer;
    during the simulated manufacture, evaluate distortions to each FE layer mesh caused by heat and structural load effects, and evaluate effects of adding different heat sink configurations to identify a design that minimizes warping of the part; and
    modify the FE model according to the distortions caused by heat and structural load effects during the simulated manufacture and according to the identified design that minimizes warping of the part; and
  control the manufacture of the part according to the modified FE model, including the distortions caused by heat and structural load effects.

8. The data processing system of claim 7, wherein simulating manufacture of each FE layer mesh includes applying simulation parameters to the FE layer mesh, including applying a heat load to the FE layer mesh according to thermal response data.

9. The data processing system of claim 7, wherein simulating manufacture of each FE layer mesh includes applying simulation parameters to the FE layer mesh, including performing a nonlinear transient heat transfer analysis of the FE model including structural load information.

10. The data processing system of claim 7, wherein simulating manufacture of each FE layer mesh includes deforming FE node point locations of the FE layer mesh according to applied simulation parameters.

11. The data processing system of claim 7, wherein receiving the FE model includes creating the FE model from a solid model.

12. The data processing system of claim 7, wherein simulating manufacture of each FE layer mesh includes applying structural loads to the entire FE model.

13. A non-transitory computer-readable medium encoded with executable instructions that, when executed, cause one or more data processing systems to:
  receive a finite element (FE) model of a part to be manufactured;
  for each of a plurality of layers:
    intersect a depositing layer line with the FE model to define an FE layer mesh that represents a manufacturing layer for the corresponding layer;
    simulate manufacture of the FE layer mesh for the corresponding layer;
    during the simulated manufacture, evaluate distortions to each FE layer mesh caused by heat and structural load effects, and evaluate effects of adding different heat sink configurations to identify a design that minimizes warping of the part; and
    modify the FE model according to the distortions caused by heat and structural load effects during the simulated manufacture and according to the identified design that minimizes warping of the part; and
  control the manufacture of the part according to the modified FE model, including the distortions caused by heat and structural load effects.

14. The computer-readable medium of claim 13, wherein simulating manufacture of each FE layer mesh includes applying simulation parameters to the FE layer mesh, including applying a heat load to the FE layer mesh according to thermal response data.

15. The computer-readable medium of claim 13, wherein simulating manufacture of each FE layer mesh includes applying simulation parameters to the FE layer mesh, including performing a nonlinear transient heat transfer analysis of the FE model including structural load information.

16. The computer-readable medium of claim 13, wherein simulating manufacture of each FE layer mesh includes deforming FE node point locations of the FE layer mesh according to applied simulation parameters.

17. The computer-readable medium of claim 13, wherein simulating manufacture of each FE layer mesh includes applying structural loads to the entire FE model.

* * * * *

UNITED STATES PATENT AND TRADEMARK OFFICE
CERTIFICATE OF CORRECTION

PATENT NO. : 10,409,933 B2
APPLICATION NO. : 14/627518
DATED : September 10, 2019
INVENTOR(S) : Louis Komzsik It is certified that error appears in the above-identified patent and that said Letters Patent is hereby corrected as shown below:

On the Title Page

1) In the left hand column, in the Header item (12); please delete "Komzisk" and insert -- Komzsik --.

2) In the left hand column, in the Inventor item (72); please delete "Komzisk" and insert -- Komzsik --.

Signed and Sealed this
Twenty-ninth Day of October, 2019

Andrei Iancu
*Director of the United States Patent and Trademark Office*